(12) United States Patent
Castell Martínez et al.

(10) Patent No.: US 8,662,850 B2
(45) Date of Patent: Mar. 4, 2014

(54) WIND TURBINE

(75) Inventors: Daniel Castell Martínez, Barcelona (ES); José Luis Román Mallada, Barcelona (ES); Miquel Ángel Colom Quetglas, Barcelona (ES)

(73) Assignee: Alstom Wind, S.L.U., Barcelona (ES)

( * ) Notice: Subject to any disclaimer, the term of this patent is extended or adjusted under 35 U.S.C. 154(b) by 0 days.

(21) Appl. No.: 13/386,840

(22) PCT Filed: Jan. 19, 2011

(86) PCT No.: PCT/EP2011/050707
§ 371 (c)(1),
(2), (4) Date: Jan. 24, 2012

(87) PCT Pub. No.: WO2011/120722
PCT Pub. Date: Oct. 6, 2011

(65) Prior Publication Data
US 2012/0121419 A1      May 17, 2012

(30) Foreign Application Priority Data
Mar. 29, 2010   (EP) .................................. 10158264

(51) Int. Cl.
*F03D 11/00*       (2006.01)
(52) U.S. Cl.
USPC ................ 416/204 R; 416/170 R; 416/244 R
(58) Field of Classification Search
USPC ............ 415/124.2; 416/170 R, 134 R, 244 R,
416/204 R; 464/69, 73, 74, 81, 82
See application file for complete search history.

(56) References Cited

U.S. PATENT DOCUMENTS

| | | | |
|---|---|---|---|
| 2,417,022 A * | 3/1947 | Stagg | 416/15 |
| 4,757,211 A | 7/1988 | Kristensen | |
| 6,911,741 B2 * | 6/2005 | Pettersen et al. | 290/44 |
| 7,935,020 B2 * | 5/2011 | Jansen et al. | 475/338 |
| 8,313,298 B2 * | 11/2012 | Berger et al. | 416/170 R |
| 2004/0108733 A1 | 6/2004 | Wobben | |
| 2006/0220389 A1 | 10/2006 | Shibata et al. | |
| 2008/0272604 A1 | 11/2008 | Versteegh | |
| 2008/0309086 A1 | 12/2008 | Takaichi et al. | |
| 2009/0015020 A1 | 1/2009 | Stiesdal | |
| 2009/0186740 A1 | 7/2009 | Saenz de Ugarte | |

FOREIGN PATENT DOCUMENTS

| | | |
|---|---|---|
| EP | 0 094 106 | 11/1983 |
| EP | 2031273 | 3/2009 |
| EP | 2164154 | 3/2010 |
| ES | 2163362 | 1/2002 |
| JP | 2001-2007781 | 7/2001 |
| WO | WO 03/037608 | 5/2003 |

OTHER PUBLICATIONS

Stiesdal, Henrik, "The Wind Turbine, Components and Operation", Bonus Energy A/S, Autumn 1999.

(Continued)

*Primary Examiner* — Ninh H Nguyen
(74) *Attorney, Agent, or Firm* — Squire Sanders (US) LLP (57) ABSTRACT

A wind turbine is described. The turbine includes a hub with one or more blades. The hub is rotatably mounted on a frame and operatively coupled to a shaft through a coupling plate mounted on the shaft. The shaft is provided at least partially internally to the frame, and the shaft is a substantially tubular hollow shaft.

15 Claims, 6 Drawing Sheets

(56) References Cited

OTHER PUBLICATIONS

International Search Report and Written Opinion of Mar. 21, 2011 for PCT/EP2011/050707.

Third party observations pursuant to Art. 115 EPC, mailed Feb. 13, 2013, 8 pgs.

\* cited by examiner

WIND TURBINE

CROSS-REFERENCE TO RELATED APPLICATIONS

This application claims priority to PCT Application No. PCT/EP2011/050707 entitled "Wind Turbine", filed Jan. 19, 2011 which claims priority to European Patent Application No. 10158264.1 entitled "Wind Turbine" filed Mar. 29, 2010 the disclosures of each of which are hereby incorporated herein in their entirety by reference.

BACKGROUND

Embodiments of the invention relate to a wind turbine. Modern wind turbines are commonly used to supply electricity into the electrical grid. Wind turbines of this kind generally comprise a rotor with a rotor hub and a plurality of blades. The rotor is set into rotation under the influence of the wind on the blades. The rotation of the rotor shaft either directly drives the generator rotor ("directly driven") or through the use of a gearbox.

Gearboxes form one of the most maintenance-intensive components of the wind turbine. They need to be inspected regularly and do not always fulfill their expected service life; the gearbox or some of its parts sometimes need to be replaced prematurely. This is due to the high loads and fluctuating loads to which a gearbox is subjected during the life of the wind turbine. Particularly, the bending loads on the blades, which may be transmitted through the rotor shaft to the gearbox are damaging.

The cause of the transmission of the bending loads and deformations from the blades and hub to the generator lies in the wind turbine configuration. In most conventional wind turbines, the rotor hub is mounted on one end of the rotor shaft. The rotor shaft is rotatably mounted in a support structure within the nacelle on top of the wind turbine tower. The rotor thus forms an overhanging structure which transmits torque, but additionally transmits cyclical bending loads due to the loads on the blades and the weight of the hub and blades. These bending loads are transmitted either to the generator (in the case of direct drive turbines) causing air gap variations or to the gearbox causing fluctuating loads in the gearbox.

Figure 1:
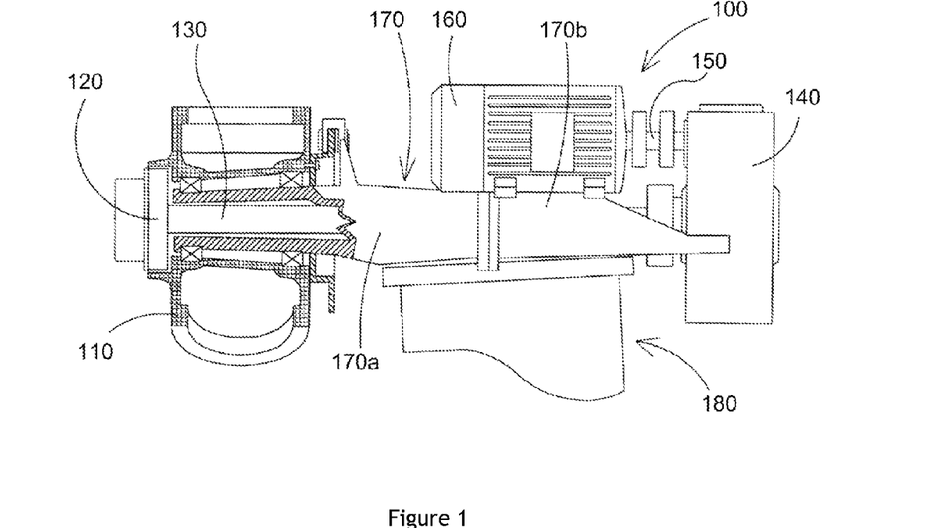
FIG. 1 illustrates a prior art wind turbine.

In order to solve this problem, it is known from e.g. ES 2 163 362 to provide a wind turbine tower with a forward extending frame. The rotor hub with its plurality of blades is mounted and can rotate upon the frame; the rotor hub is coupled to a rotor shaft located within the frame. Such a wind turbine has been schematically indicated in FIG. 1. In FIG. 1, a wind turbine 100 comprises a hub 110, which is rotatably mounted upon frame 170, at a distal end of the frame. Frame 170 is mounted upon tower 180. A coupling element 120 couples rotor shaft 130 to hub 110. The rotation of rotor shaft 130 is transformed with a gearbox 140 to a fast rotation of output shaft 150 which drives generator 160.

With this kind of configuration comprising a hub mounted on a frame, the loads due to the weight of hub and blades are transmitted more directly via the frame to the tower, whereas the rotor shaft transmits mainly torque to the gearbox (and/or generator), thus avoiding to a certain extent the undesired loads and deformations in the drive train. This represents an advantage with respect to other prior art wind turbines.

However, there still exists a need for a further improved wind turbine. Furthermore, there still exists a need for a wind turbine of reduced weight. There also exists a need for a wind turbine of reduced cost. Finally, there is also a need for a wind turbine with components that are easier to manufacture.

SUMMARY

Embodiments of the invention are defined by the claims below, not this summary. A high-level overview of various aspects of the invention are provided here for that reason, to provide an overview of the disclosure, and to introduce a selection of concepts that are further described in the Detailed-Description section below. This summary is not intended to identify key features or essential features of the claimed subject matter, nor is it intended to be used as an aid in isolation to determine the scope of the claimed subject matter.

In a first aspect, the invention provides a wind turbine comprising a hub with one or more blades, the hub being rotatably mounted on a frame and operatively coupled to a shaft through a coupling plate mounted on the shaft, wherein the shaft is provided at least partially internally of the frame, and the shaft is a substantially tubular hollow shaft.

In this aspect, the cost and weight of the wind turbine may be significantly reduced. The proposed configuration takes advantage of the fact that the loads to be transmitted through the shaft are reduced. By using a substantially hollow tubular shaft, a required moment of inertia of the shaft may be established at minimum weight.

In embodiments, the coupling plate is adapted to transmit the torque about the hub's rotational axis from the hub to the shaft while substantially limiting the transmission of other loads. This way, the loads in the tubular shaft may be further reduced as compared to a rigid coupling.

In some embodiments, the coupling plate comprises a center piece, the center piece comprising a substantially circular disc, the circular disc being connected to the hub through a plurality of circumferentially arranged axial bolts, wherein the bolts are arranged within the circular disc with a plurality of flexible bushings. This is one example of how a flexible coupling may be used to transfer the torque from the hub while substantially limiting the transfer of other loads.

In other embodiments, the coupling plate comprises a center piece from which a plurality of spokes extends radially, and wherein the hub is provided with a plurality of circumferentially arranged axial protrusions, and wherein flexible elements are arranged to connect the spokes to the protrusions. With this design, the transmission of loads other than the torque from the hub may be even further reduced, thus allowing for e.g. a thinner tubular shaft and corresponding weight reduction. In this sense, "flexible" elements are to be understood to be elements that deform or yield ("give in") relatively easily to loads in at least one direction. They may be made from any suitable material, e.g. elastomer materials, or combinations of metals with elastomers or yet other suitable materials. The elements may obtain their flexible properties e.g. due to their shape, material, positioning, mounting or combinations of these.

In some embodiments, the coupling plate comprises a substantially tubular flange and is mounted on the shaft through a shrink disc. Depending on the further design of the wind turbine, it may be advantageous to provide for a coupling that can easily be mounted and dismounted. Such a coupling may e.g. facilitate inspection and maintenance. Using a shrink disc, a coupling plate may easily be mounted and dismounted while ensuring a secure connection between coupling plate and shaft, and a secure transmission of the torque from the hub to the shaft. In these embodiments, the shaft may be of gradually increasing external diameter in the region along a portion of the shaft wherein the coupling plate is mounted. This way, a shrink disc may be pushed or otherwise forced upon the shaft in the direction of increasing diameter until a secure fit is established. In other embodiments, the coupling plate may be mounted in different ways, such as e.g. by welding, brazing, a bolted connection, through a process of thermal interference, using adhesives, a form fit using e.g. serrations provided on the shaft, combinations of the above or yet other methods. The choice for a suitable connection method may depend e.g. on the possible need for the coupling to be disassembled.

In some embodiments, the substantially tubular hollow shaft comprises one or more local reinforcements substantially in a portion of the shaft where the coupling plate is mounted. Depending on e.g. the method of coupling chosen, it may be beneficial to provide local reinforcements in the tubular shaft. Loads that occur e.g. during the mounting and/or installation of the wind turbine may be concentrated in a predetermined area of the shaft, for example where a shrink disc may be mounted. By providing local reinforcements, the whole tubular shaft does not need to be reinforced.

In some embodiments, the local reinforcements comprise a plurality of annular discs mounted internally of the shaft. Optionally, the annular discs may be welded to the inside of the shaft.

In other embodiments, the one or more local reinforcements comprise a cylindrical insert mounted internally of the shaft. Optionally, the local reinforcements further comprise an annular disc mounted internally of the cylindrical insert. In these embodiments comprising a cylindrical insert and an annular disc, the annular disc may be welded to the inside of the cylindrical insert. However, other methods of assembly may also be used.

In some embodiments, the cylindrical insert may be welded to the inside of the shaft. In other embodiments, the cylindrical insert is connected to the shaft with a plurality of bolts. Within the scope of the invention, the cylindrical insert may be connected to the shaft in any other suitable way.

In yet other embodiments, the local reinforcements comprise a substantially tubular extension of the shaft, the tubular extension having an increased thickness along at least a portion of its length. Optionally, the tubular extension is welded to the shaft.

Optionally, the local reinforcements comprise a locally increased thickness of the tubular shaft.

In some embodiments, the tubular rotor shaft is made by forming a thin metal plate into a tube and welding along a longitudinal axis of the tube. These embodiments have the advantage that the rotor shaft may be manufactured relatively easily and cheaply.

DESCRIPTION OF THE DRAWINGS

Particular embodiments of the invention will be described in the following, only by way of non-limiting examples, with reference to the appended drawings, in which.

DETAILED DESCRIPTION

The subject matter of select embodiments of the invention is described with specificity herein to meet statutory requirements. But the description itself is not intended to necessarily limit the scope of claims. Rather, the claimed subject matter might be embodied in other ways to include different components, steps, or combinations thereof similar to the ones described in this document, in conjunction with other present or future technologies. Terms should not be interpreted as implying any particular order among or between various steps herein disclosed unless and except when the order of individual steps is explicitly described.

Figure 2:
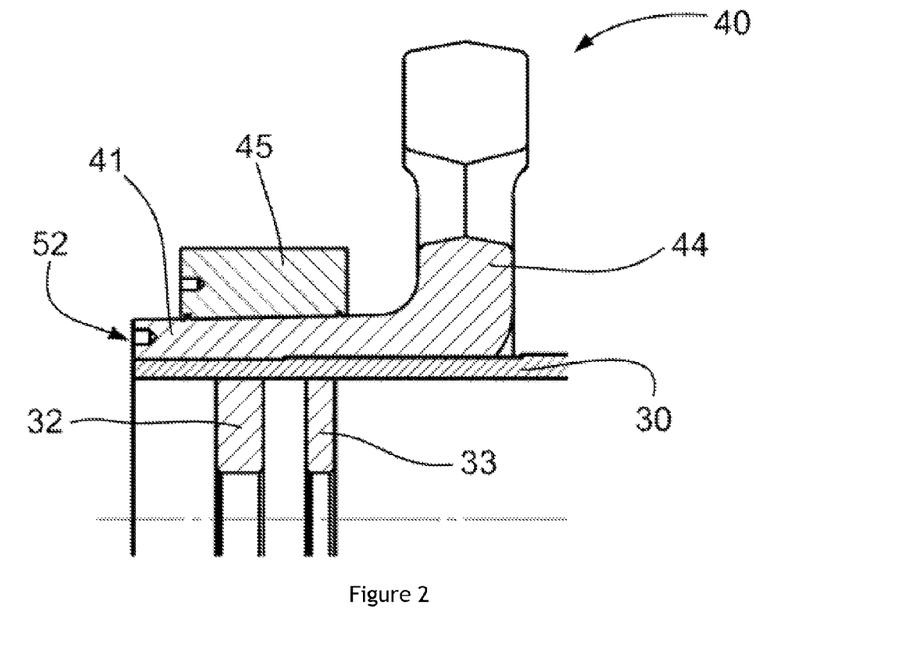
FIG. 2 illustrates a cross-section of a first embodiment of a wind turbine.

With reference to the drawings, FIG. 2 schematically illustrates a cross-section of a first embodiment of a wind turbine according to the invention. In this embodiment, a coupling plate 40 is mounted on a substantially tubular rotor shaft 30 using a shrink disc 45. The shown tubular shaft 30 is of gradually increasing external diameter (from left to right in FIG. 2) in the region wherein the shrink disc is mounted. Coupling plate 40 comprises a tubular flange 41 which has such dimensions that it fits around tubular shaft 30. The tubular flange thus is also of gradually increasing external diameter. During assembly, shrink disc 45 may be forced using e.g. hydraulic pistons in the direction of increasing diameter until the point where a secure fit is established.

To be able to withstand the loads to which the rotor shaft may be subjected both during normal operation and during installation and maintenance, in some embodiments of the invention, local reinforcements may be provided. In the embodiment of FIG. 2, the local reinforcements comprise a first and second annular disc 32 and 33 mounted internally of shaft 30. In this embodiment, the first annular disc 32 is of increased thickness with respect to second annular disc 33. The discs 32, 33 may e.g. be welded to the inside of the shaft. Bolt holes 52 may be used to attach a closing element (e.g. a plate) which closes off the shaft and protects the inside of the shaft from the environment. Further shown in the embodiment of FIG. 2 is a spoke 44 of coupling plate 40. This particular embodiment of the coupling plate will be further explained with reference to FIG. 7.

Figure 3A:
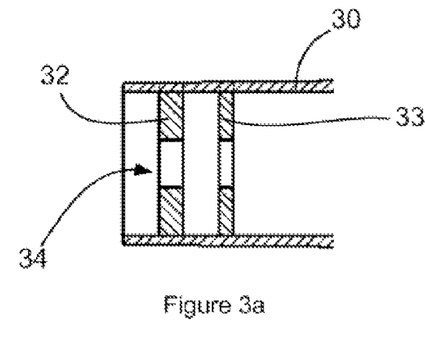
FIGS. 3a-3f schematically illustrate some embodiments of local reinforcements that may be used.

FIGS. 3a-3f schematically illustrate some embodiments of local reinforcements that may be used in embodiments of the invention. In FIG. 3a, two annular discs 32, 33 are mounted internally of the shaft 30 (similar to FIG. 2). Annular disc 32 is thicker than annular disc 33. Both discs comprise an opening 34, through which cables (e.g. electrical, fiber optic etc.) may be passed to connect systems in the nacelle to systems in the hub. It will be clear that the required thickness of the annular discs may depend on many factors, such as e.g. thickness of the substantially hollow tubular shaft, diameter of the shaft, method of mounting the coupling plate, size of the wind turbine, hub and blades etc.

Figure 3B:
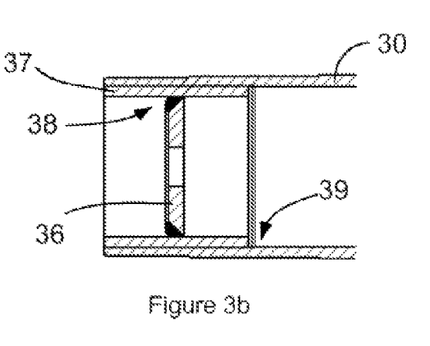

In an alternative embodiment, FIG. 3b, local reinforcements comprise a tubular cylindrical insert 37 mounted internally of shaft 30. A further reinforcement is provided in the form of annular disc 36. In this embodiment, a welded connection 38 is provided between annular disc 36 and cylindrical insert 37. Although not shown in FIG. 3b, the cylindrical insert 37 may also be welded to the inside of rotor shaft 30. In this embodiment, tubular shaft 30 comprises a local decrease 39 of its internal diameter compared to the internal diameter at the end of the shaft. The end of the shaft may be slightly enlarged to allow easier entry and positioning of cylindrical insert 37.

It should be noted that in alternative embodiments, only the cylindrical insert (without annular disc 36) may be provided as a local reinforcement.

Figure 3C:
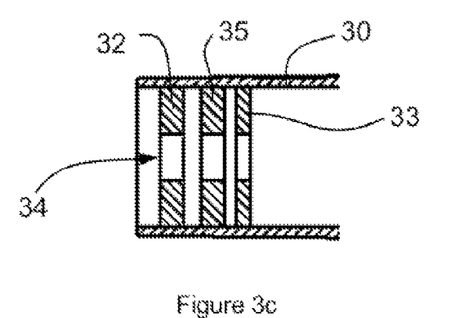

In yet a further embodiment, shown in FIG. 3c, the local reinforcements of the shaft 30 comprise three annular discs, 32, 33 and 35. In this embodiment, the annular disc 33 is of reduced thickness as compared to the other two annular discs. The annular discs may e.g. be welded to the inside of the shaft or may be mounted in an alternative way such as with bolts or similar. And similarly to the embodiment of FIG. 3a, the annular discs comprise openings 34 through which suitable cables can pass.

Figure 3D:
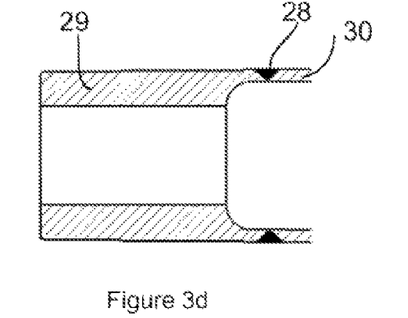

FIG. 3d schematically illustrates yet a further embodiment of a local reinforcement which may be used in embodiments of the invention. In this embodiment, a forged tubular extension 29 may be welded to one end of tubular rotor shaft 30. The tubular extension 29 is of increased thickness compared to the rest of the tubular shaft.

Figure 3E:
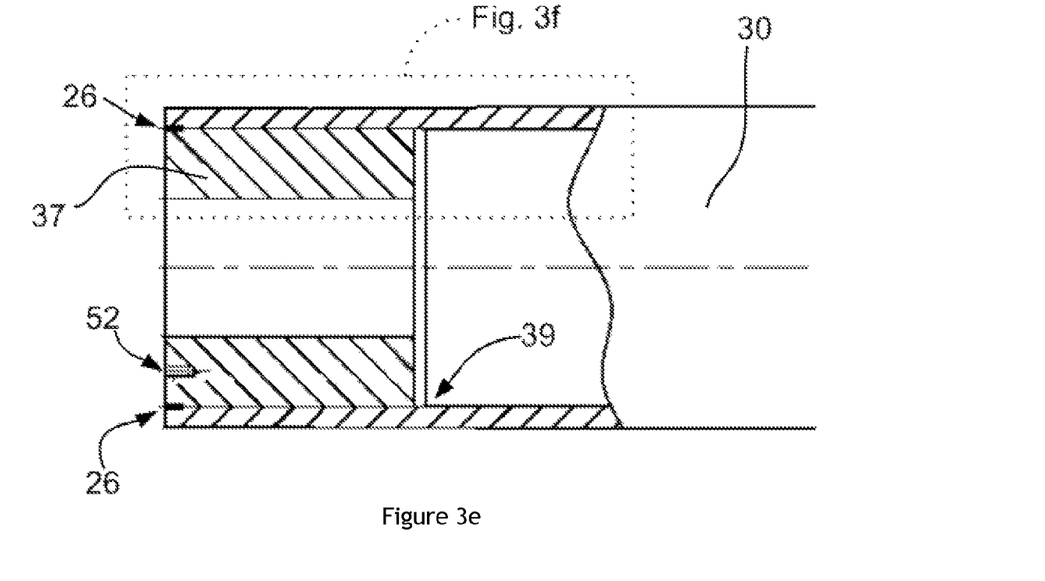

FIG. 3e illustrates yet another embodiment of a local reinforcement which may be used in embodiments of the invention. In FIG. 3e, a tubular shaft 30 is shown with a cylindrical insert 37. Bolt holes 52 may be provided to the cylindrical insert to mount a closing element for substantially closing off the shaft to the environment. In other embodiments, these bolt holes may be provided e.g. in a shrink disc mounted on the shaft, similarly to the embodiment shown in FIG. 2. Threaded holes 26 may be provided to allow fixation of the cylindrical insert 37 with respect to the tubular shaft 30. The thread may be provided partially in the shaft 30 and partially in the insert. They may then be united via suitable screws or bolts.

Figure 3F:
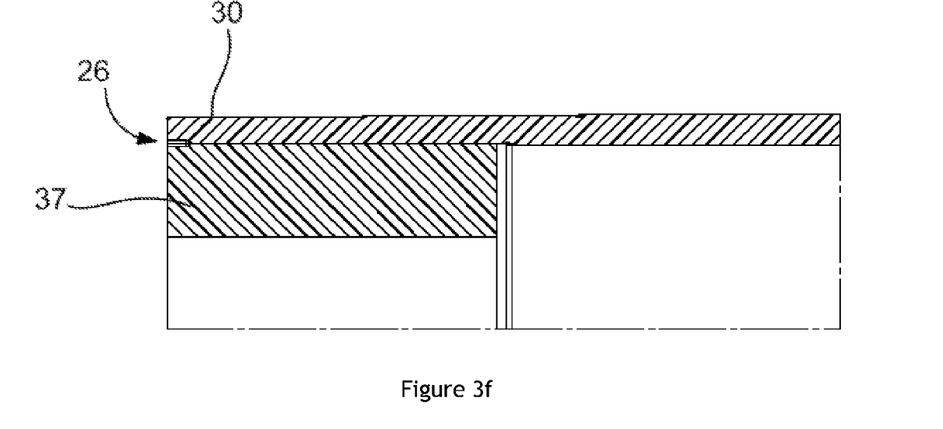

FIG. 3f shows an enlarged view of a part of FIG. 3e.

Within the scope of the invention, yet other local reinforcements may be used, such as e.g. a locally increased thickness of the tubular shaft, either in combination with any of the local reinforcements shown in FIGS. 3a-3f, or by itself. In further embodiments, the tubular shaft does not comprise any local reinforcements, when they are not needed. Such a need may depend on e.g. the method of mounting the coupling plate, the thickness and diameter of the tubular shaft, the loads on the wind turbine and other factors.

Figure 4:
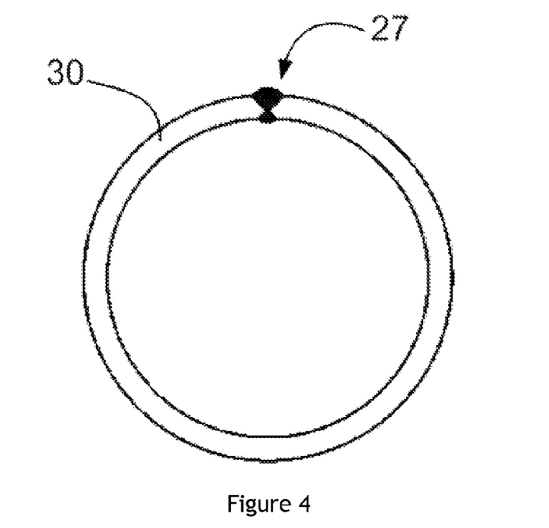
FIG. 4 schematically illustrates an embodiment of a rotor shaft which may be used in accordance with an embodiment of the invention.

FIG. 4 schematically illustrates an embodiment of a rotor shaft which may be used in embodiments of the invention. In embodiments of the invention, the rotor shaft 30 may be formed from a metal plate. Such a metal plate may subsequently be formed (such as e.g. by roll bending) into a tubular shape. The ends of the plate may subsequently be connected by welding in the longitudinal direction of the tubular shaft. A result of such a process may be a tubular shaft 30 with a weld seam 27, such as shown in FIG. 4.

In other embodiments of the invention, the tubular shaft may e.g. be formed in a forging or casting process.

Figure 5:
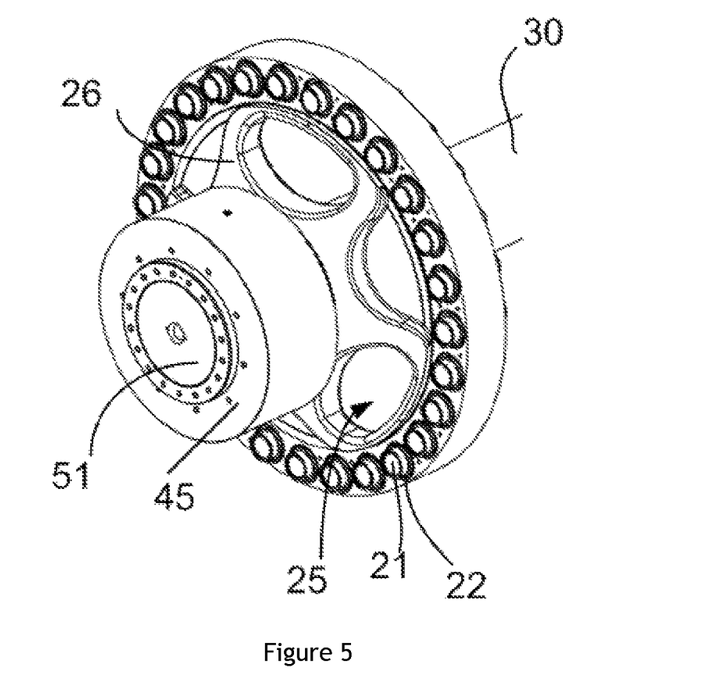
FIG. 5 schematically illustrates an example of a coupling between the hub and rotor shaft which may be used in accordance with an embodiment of the invention.

FIG. 5 schematically illustrates a wind turbine in accordance with an embodiment of the invention. Rotor shaft 30 is a substantially hollow tubular shaft. A coupling plate 26 is mounted on rotor shaft 30. Coupling plate 26 comprises a tubular extension (not shown). A shrink disc 45 is used to connect this tubular extension, and thus the coupling plate, in a secure way to the rotor shaft. In this embodiment, the annular rim of the coupling plate 26 comprises a plurality of holes. Bolts 21 may be used to connect the coupling plate 26 to the hub (not shown). The bolts 21 may be provided in flexible bushings 21. These flexible bushings may reduce the transmission of bending loads from the hub to the shaft 30. It should be noted that in this embodiment, the hub is rotatably mounted on a frame (not shown), similarly to the configuration of FIG. 1. Reference sign 51 indicates a closing element which substantially closes off the shaft and may protect its inside from the environment.

According to the invention, the rotor shaft is substantially hollow and tubular to reduce the weight and cost of the wind turbine, thus taking advantage of the reduction of bending loads in the shaft.

Figure 6:
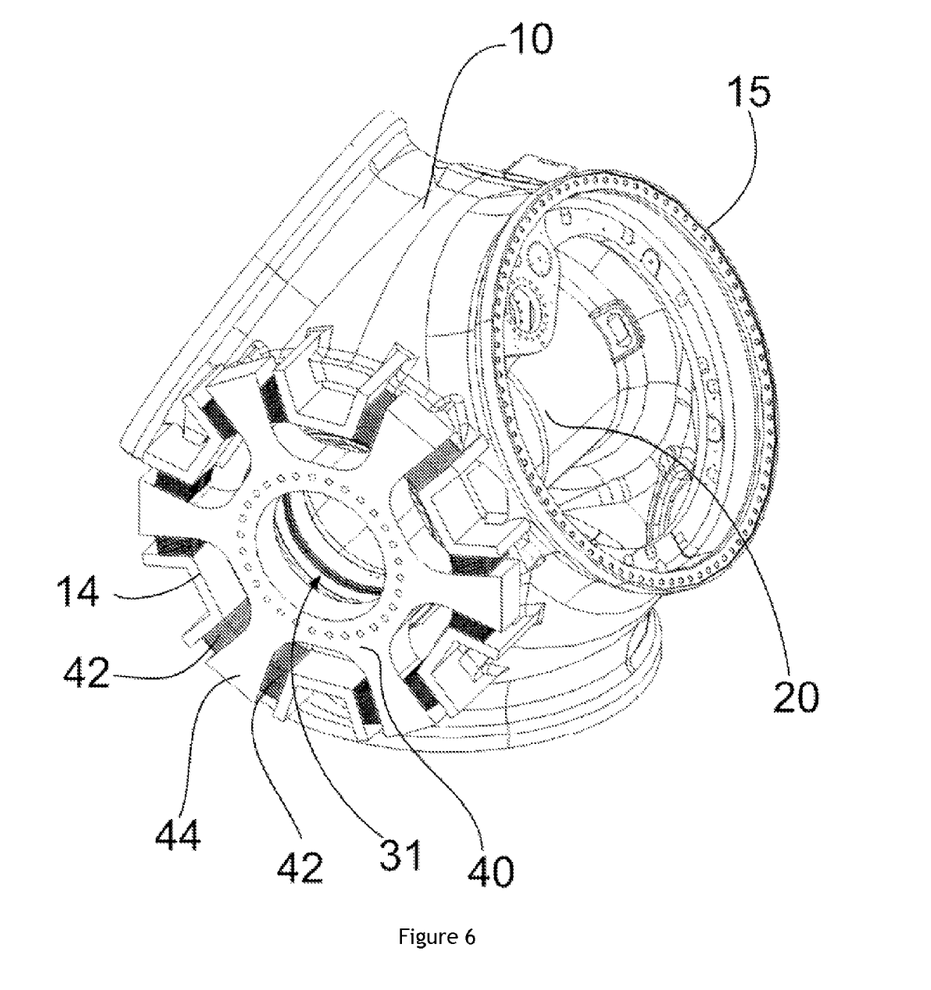
FIGS. 6, 7, and 8 schematically illustrate further examples of a coupling between the hub and rotor shaft which may be used in accordance with embodiments of the invention.

FIG. 6 schematically illustrates another coupling of a hub to a rotor shaft, which may be used in embodiments of the invention. Hub 10 is rotatably mounted on frame 20. The hub carries a plurality of blades (not shown) which may be mounted in blade root fitting 15. The hub comprises a number of protrusions 14. In the particular embodiment shown in FIG. 6, six protrusions were provided, but within the scope of the invention, this number may be freely varied.

A tubular rotor shaft (not shown) may be provided in the central opening 31 of center piece 40. Center piece 40 may thus be mounted on the rotor shaft through e.g. welding, a bolted connection, an interference fit or in yet other ways. In this embodiment, six radially extending spokes 44 are provided on center piece 40, and twelve flexible elements 42 connect the spokes 44 to the protrusions 14.

The flexible elements 42 are to be understood to be elements that deform or yield ("give in") relatively easily to loads in at least one direction. They may be made from any suitable material, e.g. elastomer materials, or combinations of metals with elastomers or yet other suitable materials. The elements may obtain their flexible properties e.g. due to their shape, material, positioning, mounting or combinations of these.

In some embodiments of the invention, the flexible elements may be elastic. In other embodiments of the invention, the flexible elements may be visco-elastic. The flexible elements may be elastic in the sense that their deformation is proportional to the applied load. They may also be visco-elastic in the sense that they exhibit time-dependent strain. Depending on the vibrations that generally occur in the wind turbine, application of elastic, visco-elastic or yet other elements may be beneficial.

Also in this configuration, all loads other than the torque from the hub may be substantially avoided in the rotor shaft. The loads from the weight of the hub e.g. are transmitted directly from the hub 10 to the frame 20. The rotor shaft thus mainly has to withstand the loads relating to torque. A substantially hollow tubular shaft may provide the required moment of inertia at minimum weight.

Figure 7:
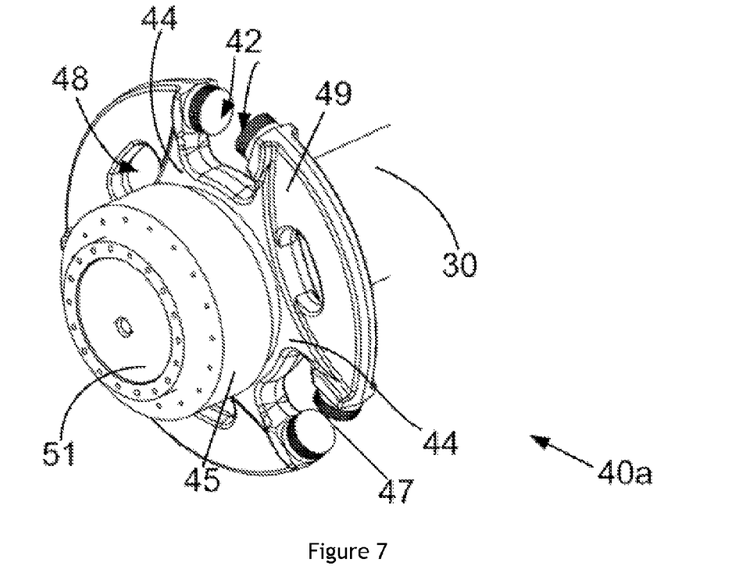
Figure 8:
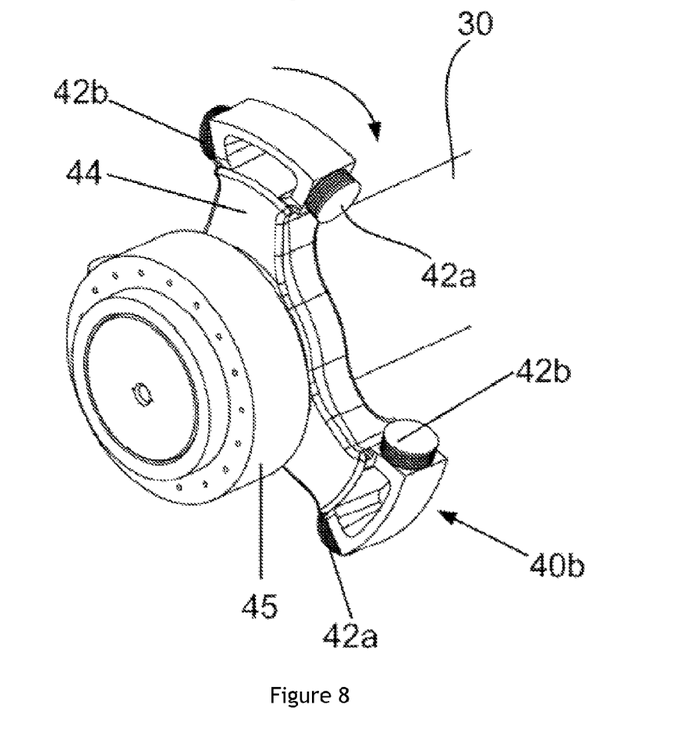

FIGS. 7 and 8 schematically illustrate other examples of couplings between the hub and rotor shaft which may be used in embodiments of the invention. A coupling plate 40a is mounted on rotor shaft 30 through a shrink disc 45. In this embodiment, the coupling plate 40a comprises six substantially radially extending spokes 44. These spokes are provided in pairs. Openings 47 are thereby created between the distal ends of the pairs of spokes 44. Suitable protrusions on the hub (not shown in this figure) can be fitted in these openings, similarly to the configuration of FIG. 6. Flexible elements 42 are provided to connect the spokes 44 to these protrusions from the hub. In this embodiment, annular segments 49 connect pairs of spokes 44 to each other. These annular segments 49 may serve to evenly distribute the loads. Access holes 48 have been provided which facilitate inspection and maintenance of the hub and components provided within the hub.

In the embodiment of FIG. 8, a center piece 40b is mounted on rotor shaft 30 using a shrink disc 45. Radially extending spokes 44 can be fitted between pairs of protrusions on the hub (not shown in this figure). Flexible elements 42 connect the three spokes 44 to the pairs of protrusions on the hub.

In both embodiments of FIGS. 7 and 8, the transmission of loads from the hub to the rotor shaft, other than the torque from the hub is substantially reduced. A substantially tubular hollow rotor shaft may thus also be used in these embodiments.

The invention is not limited in any way to the kind of bearings used to mount the hub on the frame or to mount the generator on the frame. Suitable fluid bearings, particularly hydrodynamic or hydrostatic bearings, may be employed. Alternatively, suitable rolling element bearings, such as roller bearings, double-tapered roller bearings, or ball bearings may also be used. The bearings may further be purely radial bearings or radial and axial bearings.

It will furthermore be clear that in the embodiments comprising protrusions on the hub and a coupling plate with substantially radially extending spokes, the protrusions on the hub, the spokes on the center piece and the flexible elements may take many other suitable shapes than the ones shown in the FIGS. 6, 7 and 8. The cross-section of the flexible elements may e.g. be circular, rectangular, square or other. The protrusions on the hub may e.g. be substantially thin-walled as shown in FIG. 6, or more solid.

The invention is furthermore not limited to the use of a gearbox in the wind turbine. The same coupling of the hub to the shaft may be used in wind turbine configurations comprising a gearbox and in direct drive configurations.

Although this invention has been disclosed in the context of certain embodiments and examples, it will be understood by those skilled in the art that the invention extends beyond the specifically disclosed embodiments to other alternative embodiments and/or uses of the invention and obvious modifications and equivalents thereof. Thus, it is intended that the scope of the invention herein disclosed should not be limited by the particular disclosed embodiments described before, but should be determined only by a fair reading of the claims that follow.

We claim:

1. A wind turbine comprising:
    a hub with one or more blades, the hub being rotatably mounted on a frame, surrounding the frame and operatively coupled to a shaft through a coupling plate mounted on the shaft, wherein
    the coupling plate comprises a substantially tubular flange and is mounted on the shaft through a shrink disc, and wherein
    the shaft is provided at least partially internally of the frame, and the shaft is a substantially tubular hollow shaft.

2. The wind turbine according to claim 1, wherein the coupling plate is adapted to transmit the torque about the hub's rotational axis from the hub to the shaft while substantially limiting the transmission of other loads.

3. The wind turbine according to claim 2, wherein the coupling plate comprises a center piece from which a plurality of spokes extends radially, and wherein
    the hub is provided with a plurality of circumferentially arranged axial protrusions, and wherein
    flexible elements are arranged to connect the spokes to the protrusions.

4. The wind turbine according to claim 2, wherein the coupling plate comprises a center piece, the center piece comprising a substantially circular disc, the circular disc being connected to the hub through a plurality of circumferentially arranged axial bolts, wherein the bolts are arranged within the circular disc with a plurality of flexible bushings.

5. The wind turbine according to claim 1, wherein the shaft is of gradually increasing external diameter in the region where the coupling plate is mounted on the shaft.

6. The wind turbine according to claim 1, wherein the shaft is made by forming a thin metal plate into a tube and welding along a longitudinal axis of the tube.

7. A wind turbine comprising:
    a hub with one or more blades, the hub being rotatably mounted on a frame and operatively coupled to a shaft through a coupling plate mounted on the shaft,
    the shaft being a substantially tubular hollow shaft, and
    the shaft comprises one or more local internal reinforcements substantially along a portion of the shaft wherein the coupling plate is mounted.

8. The wind turbine according to claim 7, wherein the local reinforcements comprise a plurality of annular discs mounted internally to the shaft, the annular discs being welded to the inside of the shaft.

9. The wind turbine according to claim 7, wherein the one or more local reinforcements comprise a cylindrical insert mounted internally to the shaft.

10. The wind turbine according to claim 9, wherein the local reinforcements further comprise an annular disc mounted internally to the cylindrical insert.

11. The wind turbine according to claim 10, wherein the annular disc is welded to the inside of the cylindrical insert.

12. The wind turbine according to claim 7, wherein the local reinforcements comprise a locally increased thickness of the tubular shaft.

13. The wind turbine according to claim 7, wherein the local reinforcements comprise a substantially tubular extension of the shaft, the tubular extension having an increased thickness compared to the thickness of the shaft along at least a portion of the shaft.

14. The wind turbine according to claim 13, wherein the tubular extension is welded to the shaft.

15. The wind turbine according to claim 7, wherein the shaft is arranged at least partially within the frame.

* * * * *